June 14, 1960 T. J. SCUITTO 2,941,073
HIGH-SPEED FLIP-FLOP CIRCUIT ARRANGEMENT
Filed Sept. 23, 1957
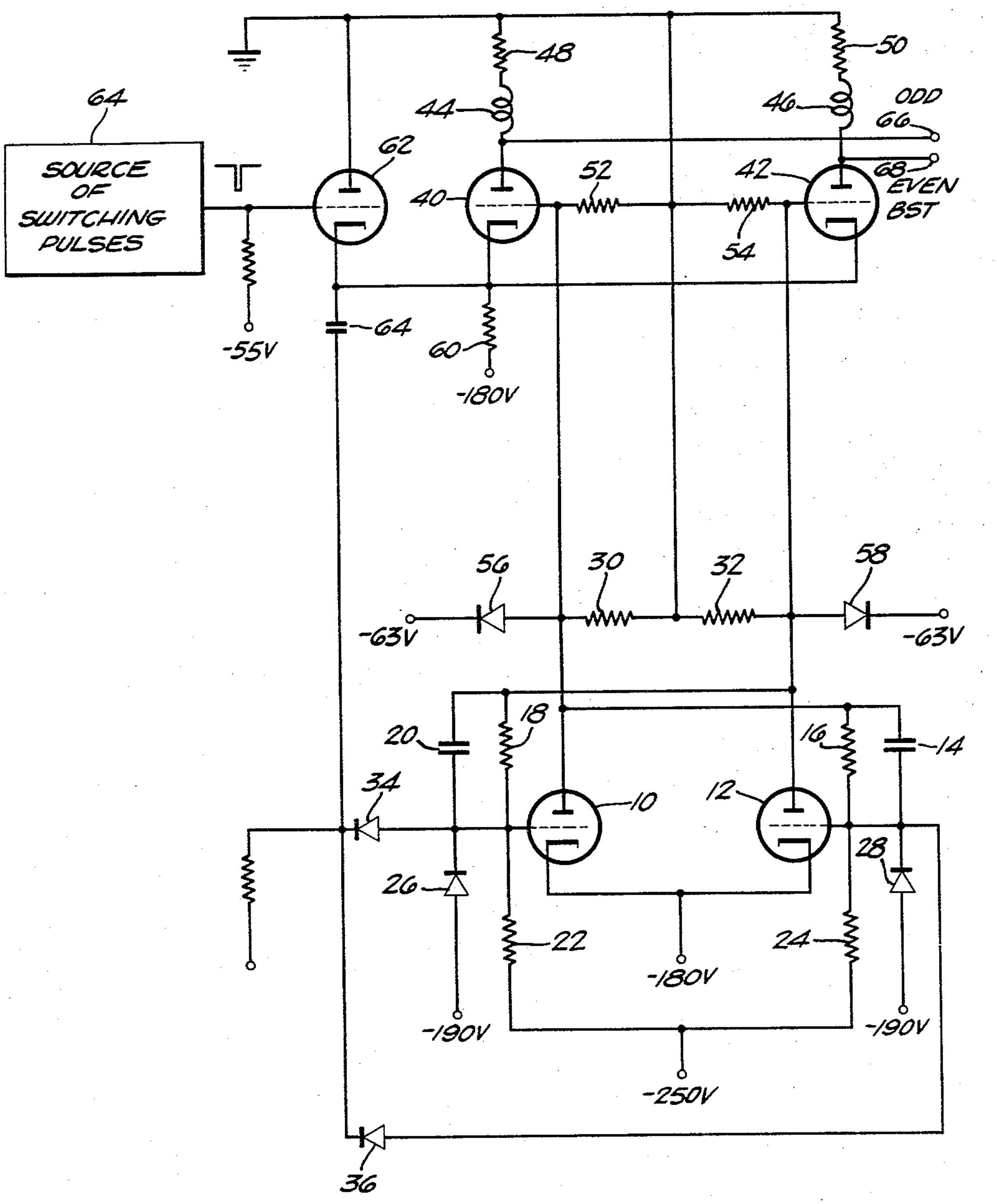
THOMAS J. SCUITTO
INVENTOR.
BY Lyon & Lyon
ATTORNEYS United States Patent Office 2,941,073

Patented June 14, 1960

2,941,073

HIGH-SPEED FLIP-FLOP CIRCUIT ARRANGEMENT

Thomas J. Scuitto, Santa Monica, Calif., assignor, by mesne assignments, to General Dynamics Corporation, Rochester, N.Y., a corporation of Delaware Filed Sept. 23, 1957, Ser. No. 685,731

6 Claims. (Cl. 250—27)

This invention relates to flip-flop circuit arrangements and, more particularly, to improvements therein.

The flip-flop circuit has found considerable utility in modern electronics apparatus. It is used extensively as an electronic switch where it is desired to apply a signal alternatively to two lines connected to following apparatus. A switching signal is usually applied to the flip-flop circuit in response to which it is driven from one stable state to another. The flip-flop circuit has two output terminals and in one of its stable conditions one of these output terminals is at a relatively more positive potential than the other. In the other stable condition, the outputs on the two terminals are reversed.

In electronic equipment, the speed of operation of the circuits employed is a very important consideration. Considerable effort has been expended to obtain flip-flop, or trigger, circuits which can operate at higher and higher speeds in response to a switching pulse. The flip-flop, or trigger circuit, is usually in a condition with conduction in one of its tubes and nonconduction in the other. Upon the application of a pulse for the purpose of switching, the one of the tubes which is conducting is driven towards nonconduction and the other of the tubes which is non conducting is driven into the conducting state. The time for this transfer of conduction can be material, and, it will be appreciated, determines the response time of the circuit. The output from the circuit is derived only when the transfer of conduction between the two tubes in the flip-flop circuit has occurred.

An object of the present invention is to avoid the limitation in speed of operation of a flip-flop circuit due to the time required for switching of conduction between the tubes therein.

Another object of the present invention is the provision of a flip-flop circuit arrangement wherein an output is derived in response to a switching pulse, even though transfer of conduction between the flip-flop tubes has not yet taken place.

Still another object of the present invention is the provision of a high-speed novel and useful flip-flop circuit arrangement.

These and other objects of the invention are achieved by employing a flip-flop arrangement, together with a pair of amplifier tubes. The amplifier tubes have a common cathode impedance, to which their cathodes are coupled, and they are biased to be nonconducting. The grids of the two amplifier tubes are respectively coupled to the two output terminals of a flip-flop circuit. A switching pulse is applied to the flip-flop circuit and simultaneously to the two cathodes of the amplifiers. Only one of the amplifier tubes will be driven into conduction. That is the one which is coupled to the more positive of the two flip-flop output terminals. The termination of the switching pulse does not immediately terminate the conduction in the now-conducting amplifier tube, in view of the fact that a certain capacitance does exist between control grid and cathode and the anode load includes a reactive impedance. However, thereafter, the conduction in the tube does terminate, and the circuit is now in condition for the next switching operation. Output is taken from the anodes of the two amplifier tubes, and, as explained, is derived substantially coincidentally with the application of the switching pulse and regardless of the turnover time required by the flip-flop circuit to switch conduction between its tubes.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, which is a circuit diagram of the invention.

Referring now to the drawing, there is seen a circuit diagram of the invention. The well-known flip-flop circuit is shown, which includes two tubes 10, 12, with the anode of the first tube 10 coupled to the control grid of the second tube 12 through a condenser 14 and a resistor 16. The anode of the second tube 12 is coupled to the control grid of the first tube 10, also through a resistor 18 and condenser 20. The grids are biased respectively through resistors 22 and 24, and they are clamped to a negative potential respectively through diodes 26 and 28. A resistor 30 serves as the anode load for the tube 10, and another resistor 32 serves as the anode load for the tube 12. The flip-flop circuit shown is the well-known, two-stable-state type, with conduction in one tube, for example, 10, and nonconduction in the other tube, for example, 12. If it is desired to switch conduction between the two tubes, a negative pulse is applied simultaneously to two diodes 34, 36, which are respectively coupled to the respective grids of the two tubes. The one of the two tubes which is conducting will respond to the negative pulse applied to its grid by reducing the flow of current therethrough. This will be communicated as a positive pulse to the grid of the nonconducting tube through the anode-control grid coupling resistor and condenser. This nonconducting tube will then commence to conduct, whereby a negative pulse is applied to the other tube through the anode-control grid coupling. This process continues with the final result that the switch in conduction and nonconduction condition of the two tubes has occurred.

As thus far described, the circuit is well known, as is also its operation. In accordance with this invention, in order to avoid the interval required for the transfer of conduction between the two tubes in response to a switching pulse, two amplifier tubes 40, 42 are employed. These amplifier tubes respectively have their anodes connected to a source of potential through a reactive load including inductances 44, 46. The inductances are in series with resistors 48, 50. The respective control grids of the two amplifier tubes are biased to be maintained normally not conducting. This is achieved by coupling the respective resistors 52, 54 between the respective grids and the source of potential and a diode 56, 58, respectively between each control grid and the source of potential. These two diodes are poled, so that the diodes are normally conductive, thus maintaining the control grids at the negative-biasing potential. The control grids are also coupled to the anodes of the respective tubes 10, 12 in the flip-flop circuit. Thus, it may be stated that the two output terminals of the flip-flop circuit are respectively coupled to the two control grids of the two amplifiers. The amount of negative bias employed is sufficient to overcome the positive signal which is derived from the nonconducting tube anode in the flip-flop circuit.

The two tubes 40, 42 also have their cathodes coupled to a common-cathode load impedance 60. These cathodes are also coupled to the cathode of a driver tube 62. The driver-tube cathode is coupled to drive not only the two cathodes of the two amplifiers, but also to drive the flip-flop circuit. It is coupled to the flip-flop circuit through a condenser 64, which is connected to the two diodes 34, 36. The input to the control grid of the driver tube 62 is derived from a source of switching pulses 64.

When it is desired to operate the flip-flop circuit arrangement, a negative pulse is applied from the source of switching pulses to the driver tube 62. The cathode of the driver tube 62 will apply this negative pulse simultaneously to the flip-flop circuit and to the two cathodes of the two amplifier tubes. The flip-flop circuit will operate in its normal mode to change conduction between the two tubes. However, the one of the two control grids of the amplifier tubes 40, 42, which is coupled to the one of the two tubes 10, 12 which is not conductive is at a more positive potential than the other driver-amplifier-tube control grid. It is sufficiently more positive than the control grid connected to the nonconducting flip-flop circuit tube, so that the negative switching pulse applied to the cathode can trigger it into the conductive state. When this occurs, the anode of this amplifier tube provides a negative pulse output. Outputs from the two anodes are applied to two output terminals 66, 68. Upon the termination of the switching pulse, in view of the grid cathode capacitance of the amplifier tubes, and in view of the reactive plate impedance, the tube which is conducting will continue to provide a negative output pulse for a time beyond the termination of the switching pulse. The values of the reactive and capacitive elements may be varied to provide an output pulse having a required pulse width.

It should be apparent that since the amplifier tube, which is rendered conductive, becomes conductive substantially instantaneously with the application of the switching pulse, the operation of the invention is more rapid than heretofore achievable where, in order to obtain an output, it is required to wait until the flip-flop circuit has transferred conduction between its tubes. The conducting amplifier tube becomes nonconducting, and the circuit is then in condition for a second switching operation. The output which is obtained from the amplifier tubes is a high-level output capable of driving subsequent electronic apparatus.

The switching pulses normally employed in apparatus such as data-handling machines are usually what are termed clock pulses, which are pulses of extremely short duration. It is essential, however, that the output of the flip-flop circuit be derived synchronously with the application thereto of the clock pulse, in order that time relationships within the information-handling apparatus be maintained. By this invention, such time relationships are preserved, regardless of the switching time required by the flip-flop circuit. It will be readily appreciated that although the arrangement described employs vacuum tubes, this is not to be construed as a limitation, since the principles described herein are applicable to other types of tubes, and also to the employment of transistors.

There has accordingly been described and shown herein a novel, useful, high-speed flip-flop circuit arrangement which permits obtaining an output substantially simultaneously with the application of an input to the circuit.

I claim:

1. A high-speed flip-flop circuit arrangement comprising a flip-flop circuit including a first and second output terminal from which relatively positive and negative outputs are derived depending on the state of said flip-flop circuit, and an input circuit to which switching pulses are applied to switch the state of said flip-flop circuit, a pair of vacuum tubes each having an anode, cathode and a control grid, means coupling the control grid of one of said pair of tubes to said first output terminal, means coupling the control grid of the other of said pair of tubes to the second output terminal, means for biasing said pair of tubes to be nonconductive, and means to apply a switching pulse to said flip-flop input circuit and to said pair of tubes to render the one of said pair of tubes conductive which is coupled to the output terminal having a relatively positive output prior to the application of said switching pulse.

2. A high-speed flip-flop circuit arrangement comprising a flip-flop circuit including a first and second output terminal from which relatively positive and negative outputs are derived depending on the state of said flip-flop circuit and an input circuit to which switching pulses are applied to switch the state of said flip-flop circuit, a pair of vacuum tubes each having an anode, cathode and a control grid, means coupling the control grid of one of said pair of tubes to said first output terminal, means coupling the control grid of the other of said pair of tubes to the second output terminal, a common-cathode impedance, means coupling the cathodes of said pair of tubes to said common-cathode impedance, means for biasing said pair of tubes to be non-conductive and means to apply a switching pulse to said flip-flop circuit and to the cathode of said pair of tubes to render the one of said pair of tubes conductive which is coupled to the output terminal having a relatively positive output prior to the application of said switching pulse.

3. A high-speed flip-flop circuit arrangement comprising a bistable state flip-flop circuit including a first and second vacuum tube one or the other of which is conductive, each tube having an anode, cathode and control grid electrode and means cross-coupling said first tube anode to said second tube control grid and said second tube anode to said first tube control grid, a third and fourth vacuum tube each having an anode, cathode and control grid, a common-cathode impedance to which said third and fourth tube cathodes are coupled, means coupling said third tube control grid to said first tube anode, means coupling said fourth tube control grid to said second tube anode, means for applying a bias to said first and second tubes to maintain said tubes nonconducting, and means for applying a switching pulse to the control grids of said first and second tubes and to cathodes of said third and fourth tubes whereby the one of said third and fourth tubes will become conductive which has its grid coupled to the one of said first and second tubes which is conducting prior to application of a switching pulse.

4. A high-speed flip-flop circuit as recited in claim 3 wherein a separate reactive load impedance is connected to the anode of said first tube and the anode of said second tube to prolong an output at the anode of the conducting one of said tubes for a desired interval beyond the termination of said switching pulse.

5. The combination with a flip-flop circuit of the type having two output terminals from which relatively positive and negative outputs are derived depending on the condition of said flip-flop circuit, and to which a switching pulse is applied to change said flip-flop condition of means for producing an output upon the application to said flip-flop circuit of a switching pulse prior to the response of said flip-flop to said switching pulse comprising a first and second amplifier means for maintaining said first and second amplifiers non-conductive, means for applying said switching pulse to said flip-flop circuit and said first and second amplifier, and means for coupling said first and second amplifiers, respectively, to the two output terminals of said flip-flop circuit for rendering conductive in response to said switching pulse the one of said two amplifiers which is receiving a more positive output from said flip-flop circuit just prior to the application of said switching pulse.

6. The combination with a flip-flop circuit of the type having two output terminals from which relatively positive and negative outputs are derived depending on the condition of said flip-flop circuit, and to which a switching pulse is applied to change said flip-flop condition, of means for producing an output upon the application of said flip-flop circuit of a switching pulse prior to the response to said flip-flop to said switching pulse comprising first and second amplifier tubes each having a cathode, anode and grid electrode, means coupling the control grid of said first amplifier tube to one of said output terminals, means coupling the control grid of said second amplifier tube to the other of said output terminals, a common-cathode impedance, means coupling said first and second tube cathodes to said common cathode impedance, means biasing said amplifier tubes to be non-conductive, and means for applying said switching pulse to said first and second tube cathodes as well as to said flip-flop circuit to render the one of said amplifier tubes conductive which has received a more positive output from said flip-flop circuit output just prior to application of said switching circuit.

References Cited in the file of this patent

UNITED STATES PATENTS

| | | |
|---|---|---|
| 2,366,357 | Schlesinger | Jan. 2, 1945 |
| 2,471,413 | Cleeton | May 31, 1949 |
| 2,534,233 | Cleeton | Dec. 19, 1950 |
| 2,589,240 | Frye | Mar. 18, 1952 |
| 2,639,379 | Blancher | May 19, 1953 |
| 2,700,696 | Barker | Jan. 25, 1955 |
| 2,745,955 | Havens | May 15, 1956 |
| 2,795,695 | Raynsford | June 11, 1957 |